(12) United States Patent
Amalfitano

(10) Patent No.: US 7,933,249 B2
(45) Date of Patent: Apr. 26, 2011

(54) GRADE OF SERVICE AND FAIRNESS POLICY FOR BANDWIDTH RESERVATION SYSTEM

(75) Inventor: Carlo Amalfitano, Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 743 days.

(21) Appl. No.: 09/778,478

(22) Filed: Feb. 7, 2001

(65) Prior Publication Data

US 2001/0033557 A1    Oct. 25, 2001

Related U.S. Application Data

(60) Provisional application No. 60/180,925, filed on Feb. 8, 2000.

(51) Int. Cl.
*H04B 7/216* (2006.01)
(52) U.S. Cl. .......................................... 370/335; 370/342
(58) Field of Classification Search .................. 370/320, 370/32, 335, 392, 441, 444, 462, 479, 321
See application file for complete search history.

(56) References Cited

U.S. PATENT DOCUMENTS

| | | | |
|---|---|---|---|
| 5,276,681 A | 1/1994 | Tobagi et al. | |
| 5,519,691 A | 5/1996 | Darcie et al. | |
| 5,673,259 A | 9/1997 | Quick, Jr. | 370/342 |
| 5,729,542 A | 3/1998 | Dupont | 370/346 |
| 5,742,592 A | 4/1998 | Scholefield et al. | 370/329 |
| 5,752,193 A | 5/1998 | Scholefield et al. | 455/452 |
| 5,784,358 A * | 7/1998 | Smith et al. | 370/230 |

(Continued)

FOREIGN PATENT DOCUMENTS

CA    2384472    4/2005

(Continued)

OTHER PUBLICATIONS

Yu, D. et al., "Fairness in Broadband ISDNS", Computers & Industrial Engineering, GB, Headington Hill Hall, Oxford, vol. 21, Nos. 1/04, pp. 325-327, 1991 XP002038657.

*Primary Examiner* — Pankaj Kumar
*Assistant Examiner* — Saba Tsegaye
(74) *Attorney, Agent, or Firm* — Volpe And Koenig, P.C.

(57) ABSTRACT

A scheme for assigning priority levels to users based upon a history of their request for access to the resources. If a user has, over a historical period of time, made fewer demands than a stated amount, that user is given a higher priority than a user who has made greater use of the resources than their stated amount. Thus, users making the heaviest demand on the available resources are allocated fewer resources despite their demand, whereas users that make less demands for the resources are granted more of the resources they request. An additional feature of an access allocation scheme according to the present invention is to reserve at least some resources for the users at the lowest priority levels. Thus, even users being assigned to a lowest priority queue will be granted at least some access once in a while. A third feature in connection with the present invention is to use the time of continuous transfer as a threshold to drop a presently assigned priority. For example, when a user at a particular priority level has made continuous use of resources for a predetermined time, that user is reassigned to the next lowest priority level and its resources are taken away. The user is then required to vie again for access to resources at this lower priority level.

9 Claims, 11 Drawing Sheets

U.S. PATENT DOCUMENTS

| | | | |
|---|---|---|---|
| 5,857,147 A | 1/1999 | Gardner et al. | 455/67.1 |
| 5,862,485 A | 1/1999 | Linneweh, Jr. et al. | 455/450 |
| 6,005,855 A | 12/1999 | Zehavi et al. | 370/355 |
| 6,011,800 A | 1/2000 | Nadgauda et al. | 370/437 |
| 6,049,549 A | 4/2000 | Ganz et al. | 370/449 |
| 6,085,241 A * | 7/2000 | Otis | 709/223 |
| 6,101,176 A * | 8/2000 | Honkasalo et al. | 370/335 |
| 6,115,390 A | 9/2000 | Chuah | 370/443 |
| 6,134,226 A | 10/2000 | Reed et al. | 370/328 |
| 6,163,697 A | 12/2000 | Peterson et al. | 455/450 |
| 6,226,277 B1 | 5/2001 | Chuah | 370/328 |
| 6,229,795 B1 | 5/2001 | Pankaj et al. | 370/329 |
| 6,243,580 B1 | 6/2001 | Garner | 455/428 |
| 6,262,980 B1 | 7/2001 | Leung et al. | 370/336 |
| 6,275,695 B1 | 8/2001 | Obhan | 455/423 |
| 6,324,184 B1 * | 11/2001 | Hou et al. | 370/468 |
| 6,426,943 B1 * | 7/2002 | Spinney et al. | 370/235 |
| 6,473,793 B1 * | 10/2002 | Dillon et al. | 709/223 |
| 6,560,460 B1 * | 5/2003 | Horneman et al. | 455/452.2 |

FOREIGN PATENT DOCUMENTS

| | | |
|---|---|---|
| EP | 0 790 725 A2 | 8/1997 |
| EP | 0 847 220 A2 | 6/1998 |
| EP | 0 977 402 A2 | 2/2000 |
| EP | 1 865 628 | 12/2007 |
| JP | 08-154267 | 6/1996 |
| JP | 11-331187 | 11/1999 |
| WO | WO 96/37081 | 11/1996 |
| WO | 98/45966 | 10/1998 |

* cited by examiner

| PRIORITY LEVEL | MAX. TIME FOR CONTINUOUS TRANSFER |
|---|---|
| 1 | 600 SECONDS |
| 2 | 120 SECONDS |
| 3 | 30 SECONDS |

| Application | Est. units/mo (during peak load time, given an acceptable speed) | Unit of Work | Unit size in Kbytes | Mo. vol. (Mbytes during peak load time) | Accept. speed (kbps-fwd) | Accept. speed (kbps-rev) | Theor. Resp. time for unit (sec) |
|---|---|---|---|---|---|---|---|
| Short Messages | 100 | Message | 0.1 | 0.01 | 14 | 14 | 0.06 |
| WAP and short e-mail | 200 | Message | 0.2 | 0.04 | 14 | 14 | 0.11 |
| e-mail | 200 | Letter | 1 | 0.20 | 28 | 28 | 0.29 |
| e-mail with attachments (Send&Receive) | 50 | Letter | 200 | 10.0 | 128 | 128 | 12.50 |
| Web Browsing (articles, text information, etc.) | 300 | Page | 20 | 6.0 | 128 | 28 | 1.25 |
| Web Browsing (e-bay, news, searching products, etc.) | 800 | Page | 50 | 40.0 | 256 | 28 | 1.56 |
| Web Downloads (programs, Applications) | 4 | Program | 5000 | 20.0 | 384 | 56 | 104.17 |
| Distant Learning | 4 | Lesson | 3000 | 12.0 | 256 | 128 | N/A |
| MP3 downloads and learning | 8 | Song | 4000 | 32.0 | 384 | 384 | 83.33 |
| Internet radio | 200 | Minute of listening | 480 | 96.0 | 64 | 28 | N/A |
| Video conferencing | 60 | Minute of session | 2880 | 172.8 | 384 | 384 | N/A |

FIG. 6

Quality of Service Estimator

175 Average

| Main | Impatience Factor | User Distribution | PeakHourLoad |

- Page Size (Kilo Bytes): 65
- Network R.T. (sec): 0.7
- Pipe Size (Mbps): 0.4
- Pipe Efficiency (%): 0.55
- Max Avg Speed per S.: 168

- N. of Subscribers: 75
- Initial Allotment(MBy): 10
- End-of-Month Allotment: 170
- Sessions Per Day: 1
- ☐ Hash ISP Birthdays

FIG. 8

GRADE OF SERVICE AND FAIRNESS POLICY FOR BANDWIDTH RESERVATION SYSTEM

RELATED APPLICATION

This application claims the benefit of U.S. Provisional Application No. 60/180,925, filed on Feb. 8, 2000, the entire teachings of which are incorporated herein by reference.

BACKGROUND OF THE INVENTION

This invention relates generally to wireless communication systems, and more particularly to a technique for allocating communication resources among a number of different users.

The widespread availability of personal computers has led to a situation where the public requires access to the Internet and other computer networks at low cost. The demand for such access is being expanded to include the need to connect portable devices, such as laptop computers, personal digital assistants, and the like, to computer networks. Unfortunately, the wireless Internet access market presents a merging of two very different cultures. The traditional wireline Internet access culture expects that access data rates are fixed, such as at the 56 kilobits per second (Kbps) which is commonly available over voice grade, residential telephone lines. This marketplace expects, however, that data transfer is unmetered, namely, users expect to transfer as much data as they wish, as long as they pay a flat fee per month. This being able to access is quite different from the traditional wireless cellular telephone model that provides voice communication. In particular, the cellular telephone network provides ready access with high quality connection rates. However, the volume of traffic is not expected to be free; that is, the users of cellular telephones have been trained to expect to have to pay a per-minute charge for access.

Market studies have shown that wireless Internet users are not likely to pay for metered access or even per-megabyte usage rates. Rather, they expect to have unlimited access or at least the appearance of being able to access unlimited volumes of data. Unfortunately, wireless system infrastructure typically provides for only a very limited amount of resources, such as wireless channels in a given cell. Thus, access to these limited physical resources must be shared among users in some way.

SUMMARY OF THE INVENTION

Only certain types of Internet traffic lend themselves easily to shared access. For example, Web browsing activity typically lends itself well to time sharing among a limited number of communication resources, such as physical communication channels. That is, the typical user behavior is to specify a Web page, and to expect that the Web page will be downloaded at high speed. But the user then spends a number of seconds, or even minutes, reviewing the contents of the page and thinking about what to do next before requesting another Web page. Thus, during periods of time when the user is thinking about what her next request will be, communication resources can be reallocated temporarily to some other user.

Other applications that increasing comprise Internet traffic do not lend themselves so well to bandwidth sharing. Applications such as real time radio broadcast, executable file downloads, music file (MP3) downloads, and the like, are quite different from typical Web browsing activity. Specifically, the user requesting such content typically ties up resources for many seconds or minutes. The user expects the bandwidth to be continuously allocated for these streaming data type download activities.

Thus, at a central control such as a base station, the pool of available resources, i.e., communication channels, can be queued and allocated to users on a demand basis. This will work fine as long as there are enough channels available to satisfy user demand. However, if the number of available resources outstrips the demand, some scheme must be devised for sharing them on a fair basis. The problem becomes a multifaceted one of determining not only how much of the available resources are to be allocated, but also to which users and when.

What is needed is a way to allow sharing of resources in such a way that degradation of service experienced by a particular user happens in a graceful fashion, and fairly, so that the users that demand more access over time are allocated fewer resources than users that have historically used fewer resources. The present invention relates to a scheme for assigning priority levels to users based upon a history of their request for access to the resources. If a user has, over a historical period of time, made fewer demands than a stated amount, that user is given a higher priority than a user who has made greater use of the resources than their stated amount. Thus, users making the heaviest demand on the available resources are allocated fewer resources despite their demand, whereas users that make less demands for the resources are granted more of the resources they request.

An additional feature of an access allocation scheme according to the present invention is to reserve at least some resources for the users at the lowest priority levels. Thus, even users being assigned to a lowest priority queue will be granted at least some access once in a while.

A third feature in connection with the present invention is to use the time of continuous transfer as a threshold to drop a presently assigned priority. For example, when a user at a particular priority level has made continuous use of resources for a predetermined time, that user is reassigned to the next lowest priority level and its resources are taken away. The user is then required to vie again for access to resources at this lower priority level.

With the invention, the grade of service experienced by any particular user depends upon historical use, plus the continuity of resource demand. The approach provides for graceful degradation of resources allocation to users in a manner which is fair, while at the same time providing users with the system access paradigm that will always provide at least some access to every user, no matter how heavy the demand they have made in the past.

The invention therefore avoids a situation whereby particular users that demand a great deal of traffic can dominate a subset of the available resources. This would otherwise exhaust the set of available channels, making it possible that no other subscriber would be able to access any channels at all. Resources are periodically taken away from high demand users and made available to other users, thereby allowing for equitable sharing of resources.

Furthermore, with the invention, a particular user is able to compete for the available channels on a more equal basis, and therefore users overall experience shorter delays, even during times of peak usage.

BRIEF DESCRIPTION OF THE DRAWINGS

The foregoing and other objects, features and advantages of the invention will be apparent from the following more particular description of preferred embodiments of the inven

FIG. 6 is a chart of typical user applications, the size of data transfers they require, and typical monthly volumes.

FIG. 8 is a chart of parameters assumed for a system simulation.

DETAILED DESCRIPTION OF PREFERRED EMBODIMENTS

Figure 1:
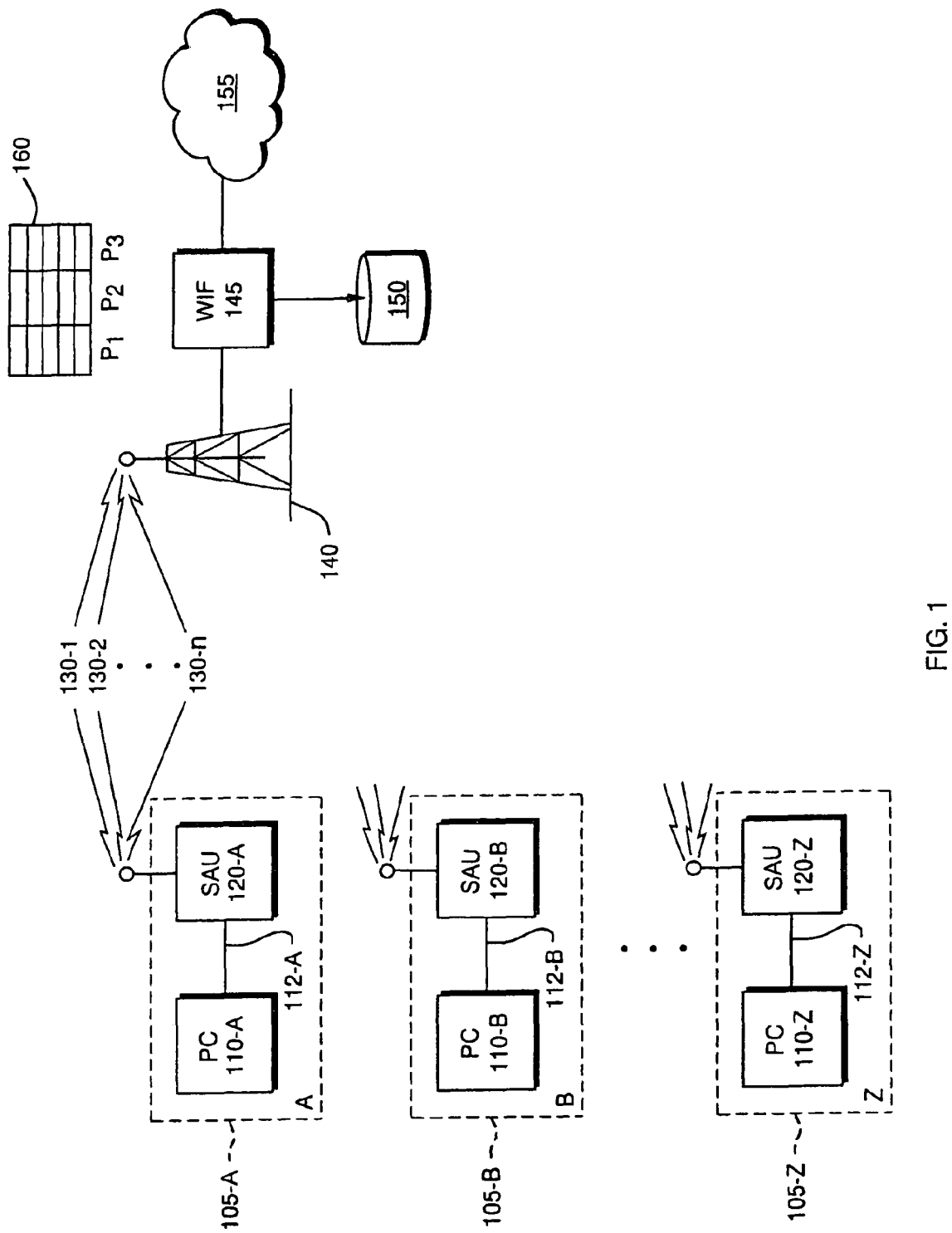
- FIG. 1 is a block diagram illustrating the components of the present invention for supporting wireless data transmissions.

FIG. 1 is a block diagram illustrating the components of the present invention for supporting multiple grades of service in wireless communication system 100. Generally, communication among multiple field units 105 and a base station 140 is achieved by transmitting data over wireless channels 130.

Each end user Personal Computer (PC) 110, as shown, is connected via a wired interface 112 to its corresponding Subscriber Access Unit (SAU) transceiver 120 over which digital data such as TCP/IP packets are transmitted. The digital data is reformatted at the transceiver 120 and transmitted over wireless channels 130 forming a reverse link.

Reformatted data packets transmitted over the wireless channels 130 are received and appropriately reassembled at the base station 140 by a Wireless Interface Facility (WIF) 145. After the received data is reassembled according to a format as originally transmitted by the corresponding field unit 105, the data packets are then further transmitted from the WIF 145 to a network 155 where they are then routed to an appropriate target device connected to the network 155.

In addition to reverse link data transmissions as described above, the wireless communication system 100 of the present invention also supports data transmissions on a forward direction, from devices connected to the network 155 to users at field units 105. In a similar manner, network data packets received from network 155 are reformatted at WIF 145 for transmission over wireless channels 130. These packets are received and then reassembled at a corresponding target transceiver unit 120 to which the data is directed. After data packets are received at the corresponding transceiver unit 120, they are reassembled in the format as originally transmitted by the source and are sent over connection 112 to the corresponding PC 110 for further processing.

Based on bi-directional communication as described above, it is possible to request information, such as a Web page, from a client server (not shown) connected to the network 155 and retrieve corresponding information over a wireless connection while at a remotely located field unit 105.

In a preferred embodiment, the forward and reverse links between base station 140 and field units 105 are defined in the wireless communication system 100 as Code Division Multiple Access (CDMA) channels. That is, each wireless channel 130 is preferably defined by an augmented pseudorandom noise (PN) code sequence. The PN code sequence and source data are modulated onto a radio frequency carrier for transmission of data over wireless channels 130. This enables a receiver to decipher one CDMA channel and its data from another based on knowing only the particular augmented PN code assigned to that channel. Hence, one or more wireless channels 130 can be assigned for communication between base station 140 and a particular field unit 105 without interference from other users.

As mentioned, wireless channels 130 support the transmission of data between each of multiple field units 105 and base station 140. In a preferred embodiment, a field unit 105 requesting to transmit or receive data is allocated multiple wireless channels 130 for creating a wireless data link. Management and allocation of wireless channels 130 is provided by WIF 145 and corresponding resources 150. Wireless channels are also allocated on a demand basis. Thus, a given field unit 105-A may only have a single slow speed physical channel allocated when it is in an idle mode; when data needs to be transferred, multiple channels are aggregated to provide high bandwidth connection. Thus, the number of channels allocated to any particular field unit at any given time may change dynamically, during the course of a given network layer connection. More information as to the formatting and demand allocation of wireless channels can be found in our co-pending U.S. patent application entitled "MAINTENANCE LINK USING ACTIVE/STANDBY REQUEST CHANNELS," Ser. No. 09/755,305, filed Feb. 1, 2001 and assigned to the assignee of the present application, which application is hereby incorporated by reference in its entirety.

A wireless link comprising multiple wireless channels 130 enables a user at field unit 105 to communicate with network 155 and corresponding terminal equipment such as remote servers. Network 155 is typically a Public Switched Telephone Network (PSTN) or computer network such as the Internet and the data is typically formatted according to a specific network protocol such as TCP/IP.

Each of multiple field units 105 compete for the use of a limited number of wireless channels 130 supported by communication system 100. For example, the demand to transmit data at any given time is potentially greater than bandwidth available for such transmissions as determined by the number of available channels and their data rates. As a result, wireless channels 130 must be fairly allocated for use among the field units 105. According to the present invention, this is done according to the users historical usage and instantaneous demand for access. That is, users that demand a disproportionately high number of available resources for extended periods of time relative to their grade of service are penalized for overuse. Accordingly, such users are placed on a lower priority level and are generally serviced less often.

Several grades of service are supported by wireless communication system 100. Field units 105 subscribing to higher grade services will be allocated a proportionally higher number wireless channels 130 when requested and higher bandwidth for data transmissions than those with lower grades of service. Hence, data transmissions for field units 105 having higher priority are typically completed in less time than that of lower priority field units 105.

Figures 2, 3:
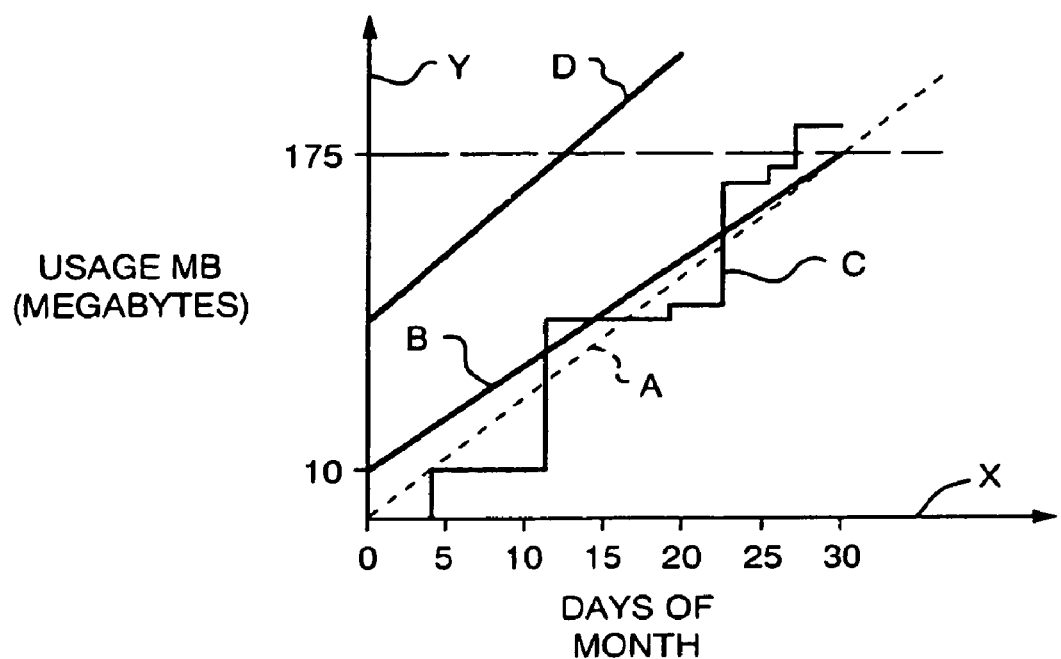
FIG. 2 is a graph illustrating allowed system usage versus actual usage of wireless channels over a one month time period according to the present invention.
FIG. 3 is a table illustrating allowed maximum continuous data transmission times according to various priority levels of the present invention.

FIG. 2 is a graph illustrating resource usage by a particular user over a course of a month. Line B represents a threshold of allowed usage for the given user at any given time over the one month period. For example, at day 1 on the x-axis, a user is allowed to use up to 10 Megabytes (MB) of data transfers before being penalized for overuse. As shown, maximum cumulative usage for a month is 170 MB at day 30. It should be noted that line B includes an initial bias of 10 MB so that a user is not immediately penalized for overuse on the first day of the month.

If actual resource usage, as illustrated by line C, is less than a corresponding point on the graph for allowed usage, line B, then the priority level of the user is generally based only on the user's predetermined subscription grade which we will call here "priority level 1." When a user's actual aggregate usage line C exceeds allowed usage line B at a given time in a month, the priority level of that user is then reduced due to overuse. Accordingly, that user will be serviced at a lower rate for that time period when line C exceeds line B. That is, a field unit 105 at a high priority level 1 will then be lowered to a priority level 2.

Notably, a user is no longer penalized for overuse if she discontinues use of wireless communication system 100 for a period of time such that actual usage on line C is again less than allowed usage line B at a given point in time. For example, by day 20, the actual usage at a point on line C is again less than allowed usage on line B.

Still other, lower priority levels may be associated with even heavier usage. For example, a line D may define a threshold of usage beyond which a user is dropped to a still lower priority level 3.

Usage of wireless communication system 100 is preferably tracked over the course of one time period, such as a month. After the month expires, actual usage as depicted by line C for a field unit 105 is reset, i.e., actual usage for the field unit 105 is set to zero for day one of the new month. Each of the multiple field units 105 preferably starts a new month at staggered times so that there is an even distribution of users penalized for overuse at any given time.

Requests for access are queued depending on a user's priority level. As shown, a queue 160 maintains lists of access requests organized by priority level. A request may be entered in the queue each time a user of a field unit 105 requests access to a content file stored on the network 155. As requests are popped off the queue, they are assigned to resources according to priority level. At least some channel resources remain available for use by lower priority users. For example, the number of channels available to users at priority level 1 may be a multiple, N, of the number of channels allocated for priority level 2 users. Similarly, the number of channels allocated for priority 2 users may be a multiple, M, of those assigned to priority level 3 users. Where X represents the total system resources allotted to priority level 1 users, the net effect is to allocate wireless channels 130 according to priority levels 1::2::3 in the ratio of X::X/N::[X/(N*M)]. That is, fewer resources are allocated for use by lower priority level users, but there are always at least some resources available to such users.

In the preferred embodiment, the priority ratio assigned to users at different priority levels is respected independently of the total number of users assigned to each given priority level. With this approach, the changes in the ratio of users assigned to a priority 1 level as opposed to, for example, the users assigned to a priority 2, in effect changes the amount of resources the priority 1 users collectively have available.

The queue 160 allocates resources to priority levels according to the stated rates. To understand how this is done in a preferred embodiment, assume, first of all, that the system has assigned two priority levels, $p_1$ and $p_2$, representing the number of users at each respective priority level. Thus, for example, $p_1$=% users at priority 1

$p_2$=% users at priority 2

We also define a priority ratio, R, which is a ratio of the desired allocation of resources to users at the two priority levels. In the example being described, we assume that this ratio is 1/4, i.e., the number of resources allocated to the priority 1 users is desired to be four times the number of resources allocated to the priority 2 users. We can define two unknown quantities x and y as follows:

x=% of resources assigned to priority 1 users y=% of resources assigned to priority 2 users and the priority ratio becomes $$R=y/x$$

We can then determine that y=Rx.

Assume now that the number of users at priority 1 is 90% of the total number of users and those assigned to priority 2 are 10% of the available users. A simple resource split would mean that 80% of the resources are allocated to 90% of the users (at priority 1), and 20% of the resources are allocated to 10% of the users (at priority 2). This would mean, however, in effect, a greater number of resources are actually allocated to each of the lower priority users, i.e., a lower priority 2 user would be given 20/10 or 2% of the resources, whereas a priority 1 user would only be getting 80/90 or 0.88% of the resources.

A better scenario for determining resource allocation proceeds as follows. Since the total available amount of resources will always equal 100%, we can devise a relationship as follows:

$$x(p_1)+y(p_2)=100$$

Substituting the known allocation ratio identity for y, we then have the following:

$$x(p_1)+Rx(p_2)=100$$

Inserting the known ratios of users at each priority level provides the following relationship:

$$x(90)+(x(10)/4)=100$$

Solving for x, we have $$90x+2.5x=100$$

or $$92.5x=100,$$

$$x=100/92.5=1.08$$

The 1.08 is a percentage that indicates the amount of resources to be allocated to each user at priority level 1. This gives us a total percent of resources allocated to the priority 1 users at $$1.08\times 90\%=97.2\%.$$

With y equaling x/4, 0.27 is the percent of resources allocated to each priority 2 user. A total of $$0.27\times 10\%=2.7\%$$

of the resources are therefore allocated among all priority 2 users.

In this way, the priority ratio R is respected independent of the total number of users assigned to each priority level.

Therefore, this calculation is redone each time that users are assigned to different priority levels.

FIG. 3 is a table illustrating how users may be penalized for using the wireless channels 130 for extended periods of time. For example, a user subscribing to the highest priority level 1 is allowed to transmit on a continuous basis for up to 600 seconds. If this time threshold is exceeded, priority of that user drops to a next lower level based on overuse. Thus, a priority one user would be reduced to priority 2 if a corresponding transmission exceeds 600 seconds. As shown, subscribers with lower priorities are allowed less time to continuously transmit data in wireless communication system 100 before they are penalized.

Placing a time limit on continuous usage has an effect of penalizing users who are requesting large executable file transfers, audio files, or the like, and avoids penalizing users who are performing normal Web browsing activities. Thus, a user who downloads a Web page may only need enough resources for, say, a 50 kbyte (kb) transfer. While the user reads the Web page, he no longer needs the wireless channels, and they can be reallocated for other users in the system. This type of user typically would not run past the 600 second threshold at priority level 1. However, another user who is downloading an MP3 audio file will typically run up against this 600 second threshold. His allocated channels are then taken away, and he is placed in the queue for the lower priority users to vie for access to them again.

Figure 4A:
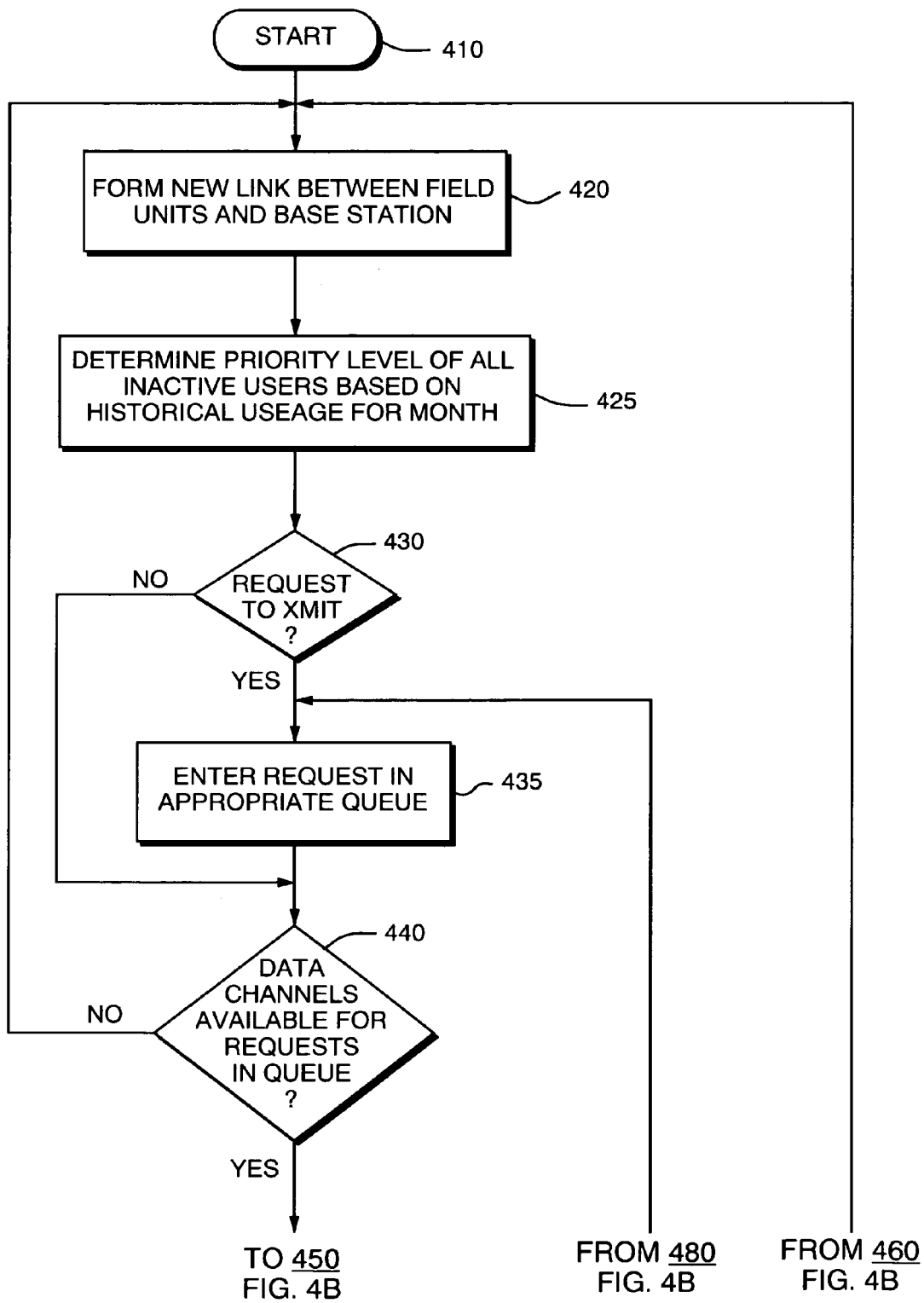
FIGS. 4a and 4b are a flowchart illustrating a method of allocating wireless channel usage among multiple competing users of the wireless communication system of the present invention.
Figure 4B:
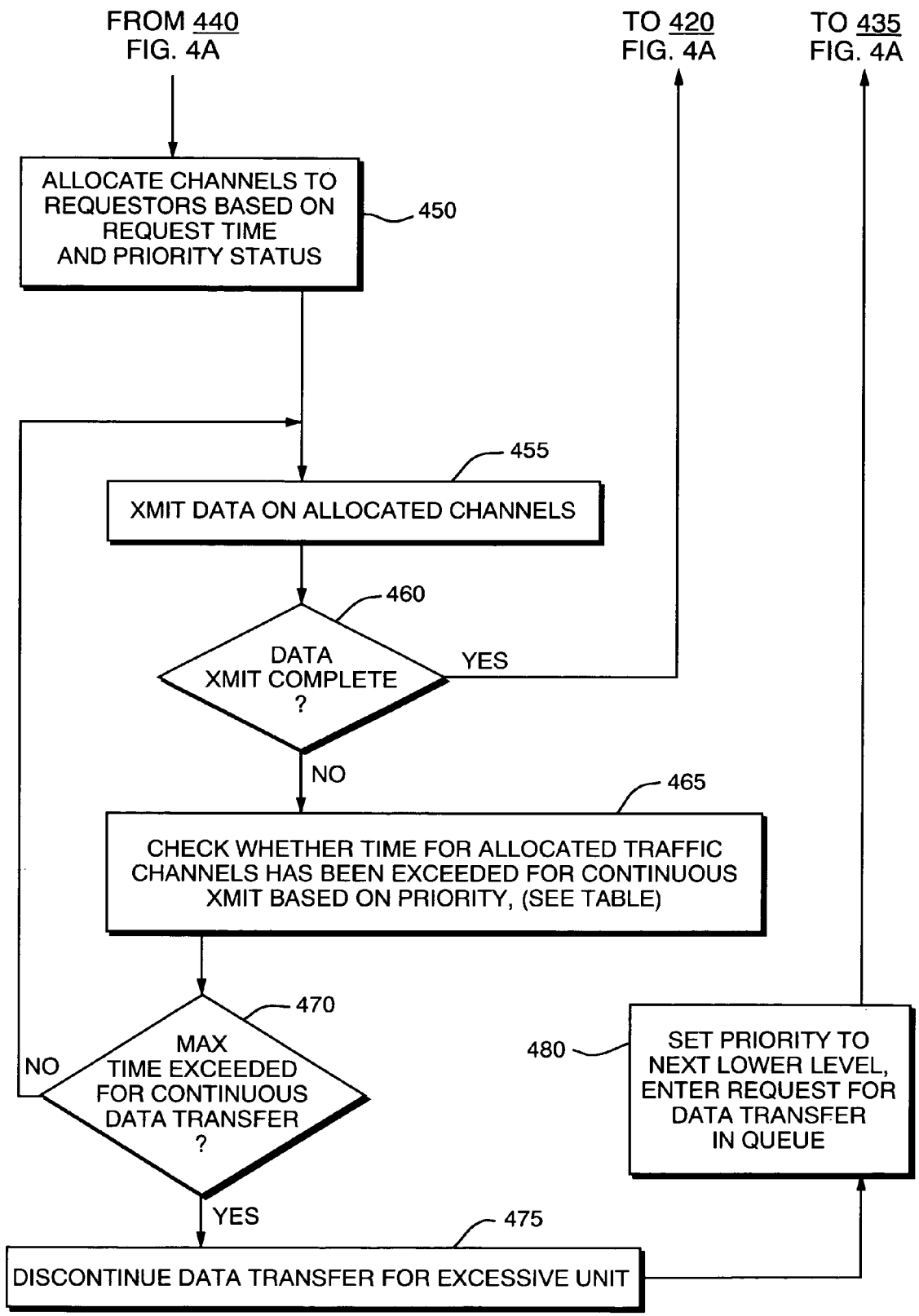

FIGS. 4a-b is a flowchart describing a method of servicing access requests based on a priority scheme. Reference 410 shows an entry point for execution. In step 420, new links are formed between newly activated field units 105 and base station 140. At this point, wireless traffic channels 130 are not assigned for use, typically only maintenance channels. In step 425, system management unit at base station 140 then determines the priority level of all inactive users based on historical usage for the month as described earlier for FIG. 2.

It is then determined in step 430 whether there is a request to transmit by any of the active but non-transmitting field units 105. If so, such a request to transmit is entered into a queue in step 435. If there is no new request to transmit, program flow continues at step 440 where it is determined whether there any wireless channels 130 available for supporting data transmission requests pending in the queue. If there are not any wireless data channels 130 available to service transmission requests, flow of the program loops back to step 420.

If there are wireless channels 130 available in step 440, flow continues at step 450 where available wireless channels 130 are allocated for servicing particular transmission requests. Data is then transmitted on allocated wireless channels 130 in step 455.

If a data transmissions has completed for a particular user in step 460, flow loops back to step 420. On the other hand, if the data transmission has not completed, it is determined in step 465 how long a particular user has been continuously transmitting data (see FIG. 3 for threshold actual values). If the maximum time for a data transfer is exceeded in step 470, the corresponding data transfer is discontinued in step 475 and a lower level of priority is assigned to the user due to overuse in step 480. Thereafter, program flow loops back to step 435.

If the time for transmitting data has not been exceeded in step 470, program flow loops to step 455 until the data transmission has completed or when the maximum time for a continuous transmission has been exceeded.

Figure 5:
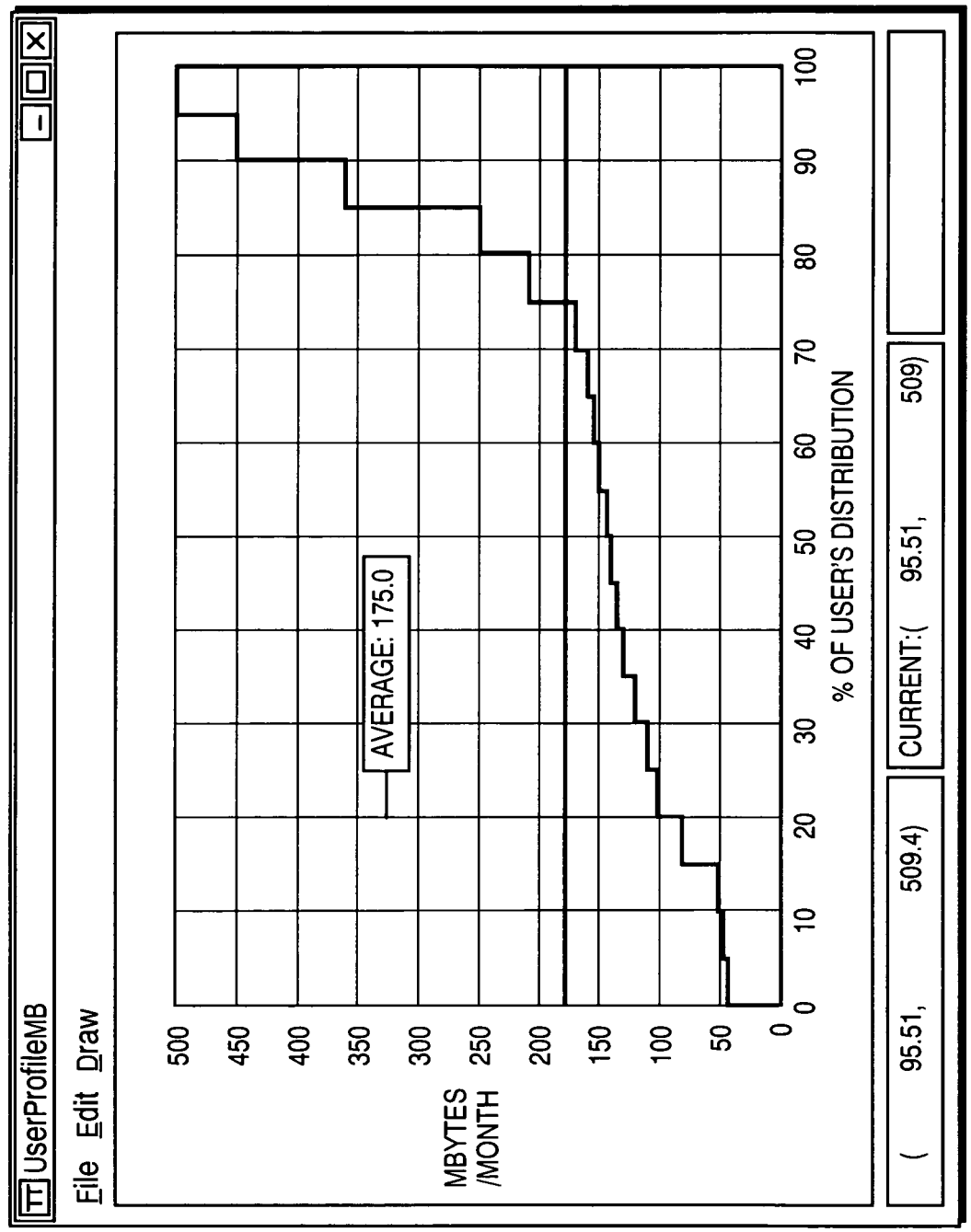
FIG. 5 is a diagram illustrating a typical distribution of users versus traffic demand in a given month.

FIG. 5 is a chart showing one possible distribution of users versus expected demand for resource access. As seen from the chart, an average user may request, for example, 175 Megabytes (MB) of data transfers per month. A small percentage of users, such as 10% of users, request less than 50 MB per month, the highest 10% of users requesting 450 MB or more of data transfers per month.

FIG. 6 is a chart of typical Internet data transfer applications and their expected characteristics. For example, one such application is short messages. The typical user is expected to have 100 units of short messages per month with a unit size of 0.1 kilobyte. The chart shows similar estimated units per month and unit size for Wireless Access Protocol (WAP) data, short e-mail messages, normal size e-mail messages, e-mail messages with attachments, text-based Web browsing, news- and searching-based Web browsing, Web downloads, distance learning, MP3 downloads, and audio file sharing, Internet radio, video, and video conferencing. This chart is presented as an example of a range of applications used by the system 100 to estimate average monthly loads.

Figure 7:
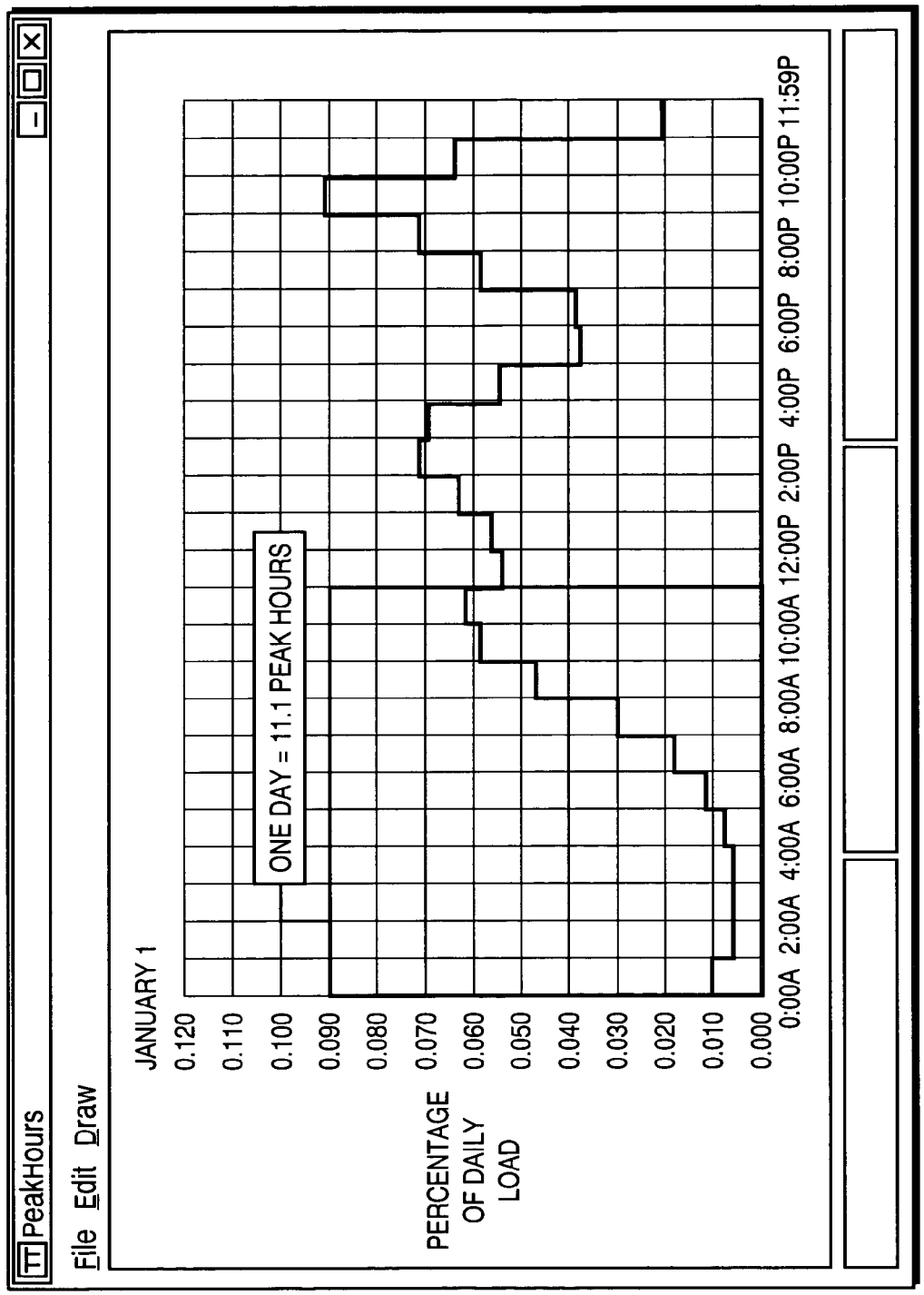
FIG. 7 is a typical daily peak usage graph.

FIG. 7 is a chart of peak daily load versus time of day. Peaks are seen to occur at approximately 10:00 a.m., 2:00 p.m., and 9:00 p.m., with periods of minimum usage occurring from 1:00 a.m. to 4:00 a.m.

The peak usage graph of FIG. 7 and the application types of FIG. 6 were used in a simulation to determine an average expected response time at various times of day. FIG. 8 illustrates additional assumptions made in the simulation. These include an average page size of 65 kilobytes, a network round trip delay time of 0.7 seconds (that is, the delay from the base station out through the network and return round trip), a 400 kilobit-per-second shared bandwidth size, that is, the amount of bandwidth that is shareable by the users, and a pipe efficiency of 55%. Other assumptions made were a maximum average speed per subscriber of 168 kilobits per second, that is, a maximum amount of resources that may be assigned to any one user at any one time. Also assumed was the number of subscribers and/or users in the cell at 75. The initial allotment offset was set to 10 MB and the end-of-month allotment was 175 MB. In the simulation, each user was assumed, on average, to make a request for one access per day.

Figure 10:
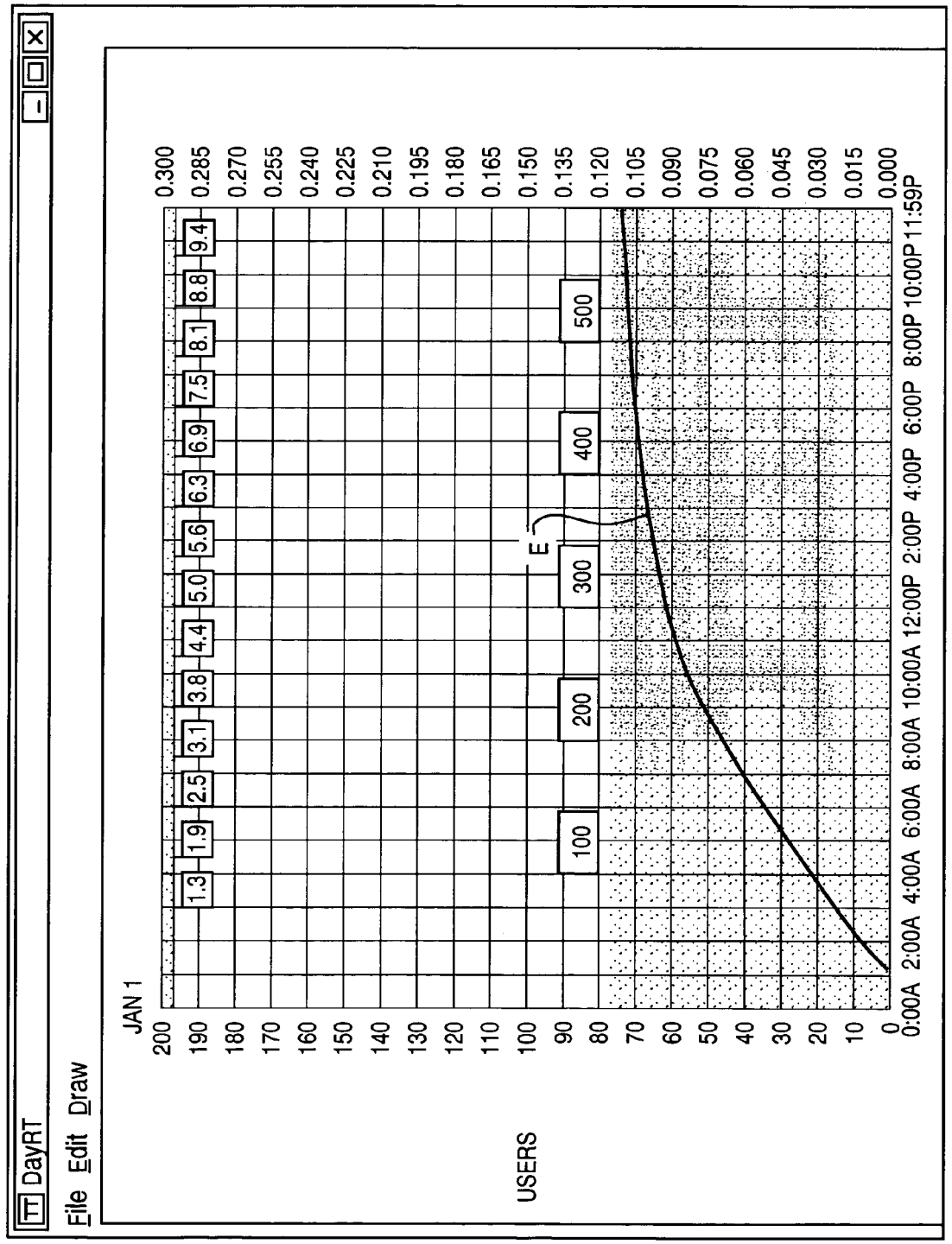
FIG. 10 illustrates response time experienced by users of different types in an average day.

The results of the simulation are shown in FIG. 10. This figure illustrates seconds of response time on the x axis versus user index number on the y axis. The user index number was assigned from 1 to 75, with the lowest user number being the user making the least demand on the system, and the highest user number (index 75) being the user making the most demand on the system. The user demands were assumed to be distributed according to the distribution in FIG. 5. The squares on the x axis are in increments of 10 minutes. The simulation was run over a period of 3 months in a system having two priority levels that were each allocated resources based upon the previously described algorithm of FIGS. 4a and 4b.

Figure 9:
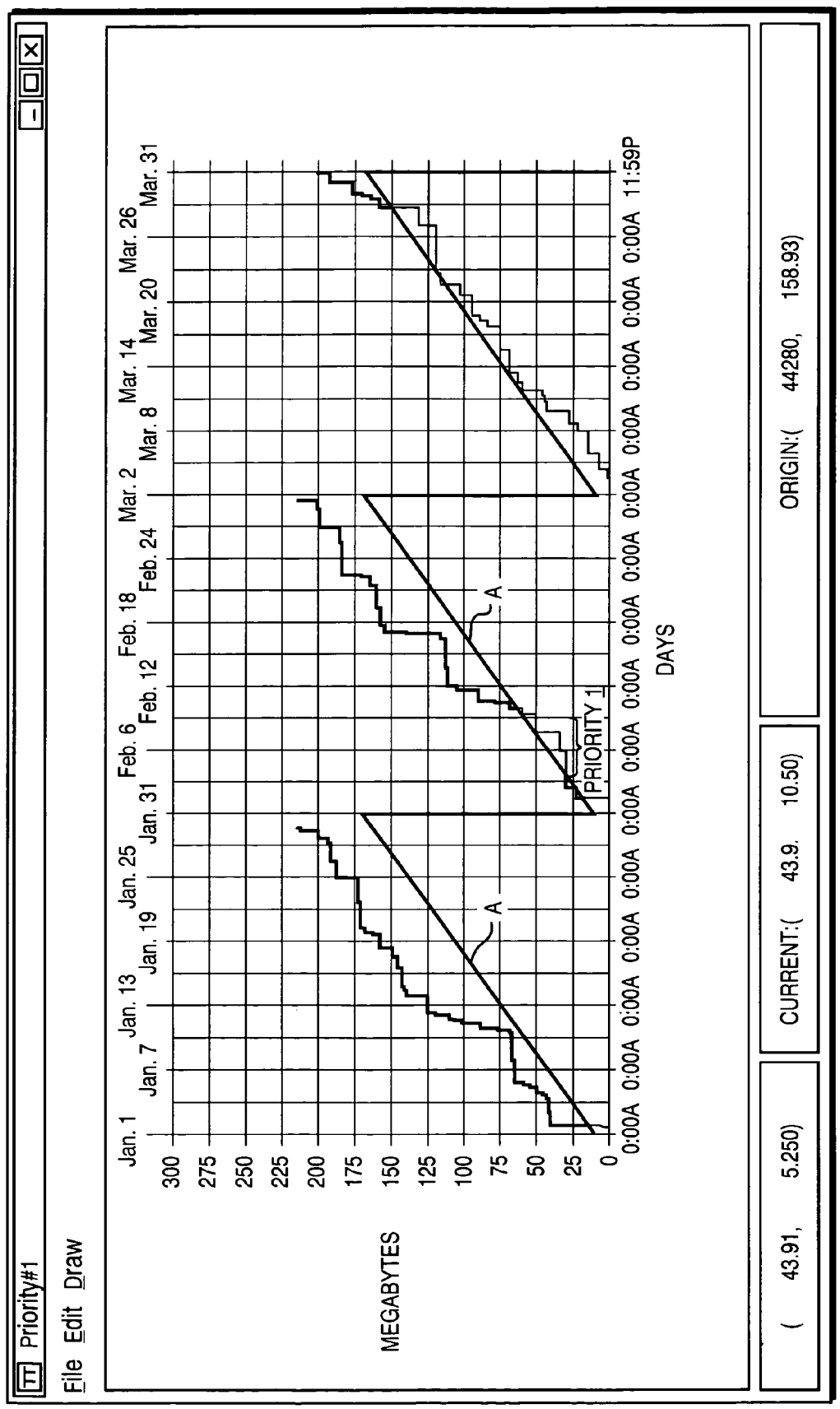
FIG. 9 illustrates a usage graph for one particular exemplary user.

Curve E in FIG. 10 illustrates the approximate number of average MB per month per given user as indicated by the 100, 200, 300, 400, and 500 tabs on the upper x axis. For example, user 20 is utilizing approximately 100 MB per month and exemplary user 52 is using approximately 230 MB per month. FIG. 9 illustrates a usage graph for an exemplary user index 52 from the simulation. User index 52 is making use of an average of approximately 225 MB per month as illustrated. The average resource use by this user is applied against the allocation curve A. Thus, it is seen that for much of the time during the month of January, user 52 has exceeded his allotment and therefore is operating at priority level 2. At the beginning of February, user 52 did stay below his allotment curve A for a number of days, from February 3 through February 9, at which time he was at a priority 1. User 52 then exceeded his allotment and dropped to priority 2 for the remainder of February. During most of the month of March, user 52 was at priority level 1, exceeding his allotment only for one day, at March 21, and then again from approximately March 29 through March 31.

The end result of the simulation shown in FIG. 10, is a plot of response time observed. As can be seen, the heaviest users, such as those at index 60 and above, experience longer response time than the light users with indices from 1 through 10. These users at the lower portion of the demand curve experience minimum response time, even during peak hours of the day.

Figure 11:
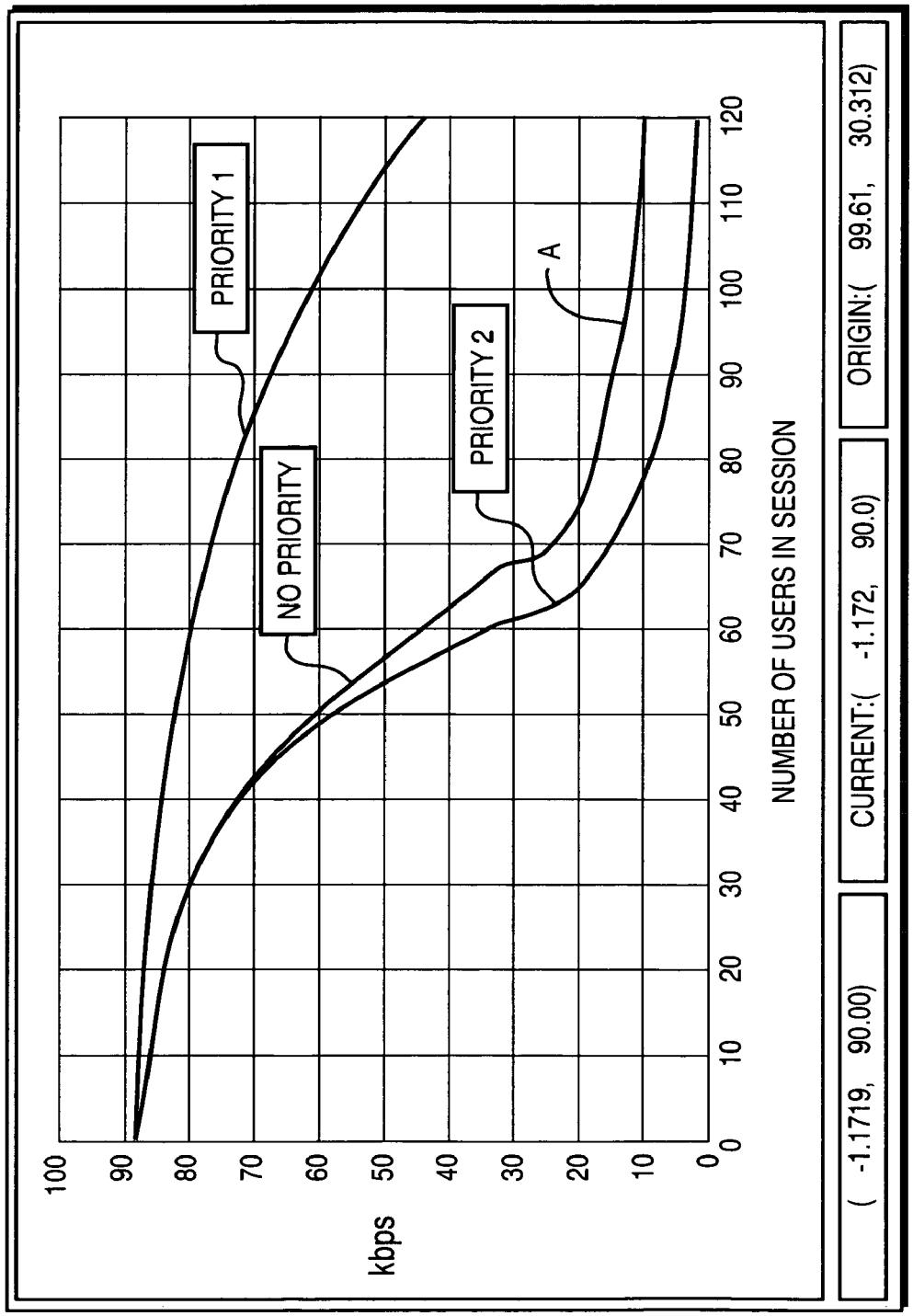
FIG. 11 illustrates how the assignment of just two priority levels improves overall access speed for high priority users.

FIG. 11 is another chart illustrating the advantages available with the invention. This chart assumes that the available resources were allocated evenly among users in the 50-50 ratio among priority 1 and priority 2 users. In curve A in the middle of the figure, there was no priority assigned to allocation of channels. The users collectively, therefore experience, for example, when the number of users exceeds approximately 50 in session at the same time, the amount of data bandwidth available to any given user is dropping rapidly. However, in a system where these two priority levels are available, the priority 1 user is experiencing a very graceful degradation in the level of service they are provided as illustrated by the priority 1 curve.

We have seen therefore how the rate of service allocated to particular users depends on historical use over a period of time a month, plus continuity of resource allocation, such as during an instantaneous session. This approach provides for graceful degradation of allocation while at the same time allocating resources fairly. The result is as follows if the system is not overloaded, all users are given the resources that they request. However, once the system becomes overloaded, users with a history of usage that is greater than their average allowed use will be given a lower priority than those users that have a history of usage below their allotment. The system has another rule based on the continuous time allocation for a specific connection and once these thresholds are exceeded, the user will be dropped to a lower priority level.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for use in a code division multiple access (CDMA) base station for providing multiple grades of service to a plurality of subscriber units requesting traffic channels, the method comprising:
    detecting requests for access from a plurality of subscriber units to transmit data to or receive data from the base station using a plurality of traffic channels;
    assigning a priority level for each of the detected requests, the priority level associated with the subscriber unit transmitting the request, wherein the priority level of the subscriber unit depends on the priority level of all inactive users, on a continuity of resource demand and on historical usage of base station resources, and wherein a ratio of subscriber units assigned to different priority levels is respected independently of the total number of subscriber units assigned at each priority level;
    comparing a time allocation of continuously used channel resources for each of the subscriber units against a predetermined time threshold of allowed usage and reducing the priority level on a condition that the predetermined time threshold is exceeded;
    allocating at least one traffic channel to each of the subscriber units requesting to transmit data to or receive data from the base station based on the priority level of the subscriber unit, wherein a subscriber unit with a lower priority level is allocated fewer traffic channels than a subscriber unit assigned a higher priority level; and
    assigning a lower priority level to a subscriber unit on a condition that the time allocation of continuously used channel resources is higher than the predetermined time threshold.

2. The method of claim 1 wherein the subscriber unit is assigned a higher priority level on a condition that the subscriber unit's historical usage is lower than the time threshold for a predetermined period of time.

3. The method of claim 2 wherein the higher priority level results in the subscriber unit being allocated more traffic channels than a subscriber unit assigned a lower priority level.

4. The method of claim 1, further comprising:
    reserving at least one traffic channel for subscriber units having the lowest priority level; and
    creating a queue of detected requests from subscriber units with the lowest priority level to ensure that subscriber units with the lowest priority level are allocated the at least one traffic channel at predetermined times.

5. A code division multiple access (CDMA) base station comprising:
    circuitry configured to detect a request from a plurality of subscriber units to transmit data to or receive data from the base station using a plurality of traffic channels;
    circuitry configured to assign a priority level for each of the detected requests, the priority level associated with the subscriber unit transmitting the request, wherein the priority level of the subscriber unit depends on the subscriber unit's historical usage of base station resources, on the instantaneous demand for access and on a continuity of resource demand, wherein a ratio of subscriber units assigned to different priority levels is respected independently of the total number of subscriber units assigned at each priority level;
    circuitry configured to compare a time allocation of continuously used channel resources for each of the subscriber units against a predetermined time of allowed usage threshold and to reduce the priority level on a condition that the predetermined time threshold is exceeded; and
    circuitry configured to allocate the traffic channels to each of the subscriber units requesting to transmit data to or receive data from the base station based on the priority level of the subscriber unit, wherein a subscriber unit with a lower priority level is allocated fewer traffic channels than a subscriber unit assigned a higher priority level.

6. The code division multiple access (CDMA) base station of claim 5 wherein the subscriber unit is assigned a lower priority level on a condition that the subscriber unit's historical usage is higher than the time threshold for a predetermined period of time.

7. The code division multiple access (CDMA) base station of claim 5 wherein the subscriber unit is assigned a higher priority level on a condition that the subscriber unit's historical usage is lower than the time threshold for a predetermined period of time.

8. The code division multiple access (CDMA) base station of claim 7 wherein the higher priority level results in the subscriber unit being allocated more traffic channels than a subscriber unit assigned a lower priority level.

9. The code division multiple access (CDMA) base station of claim method of claim 5, further comprising:
   circuitry configured to reserve at least one traffic channel for subscriber units having the lowest priority level; and
   circuitry configured to create a queue of detected requests from subscriber units with the lowest priority level to ensure that subscriber units with the lowest priority level are allocated the at least one traffic channel at predetermined times.

\* \* \* \* \*